US008559639B2

(12) United States Patent
Hird (10) Patent No.: US 8,559,639 B2
(45) Date of Patent: *Oct. 15, 2013

(54) METHOD AND APPARATUS FOR SECURE CRYPTOGRAPHIC KEY GENERATION, CERTIFICATION AND USE

(75) Inventor: Geoffrey R. Hird, Cupertino, CA (US)

(73) Assignee: CA, Inc., Islandia, NY (US)

( * ) Notice: Subject to any disclaimer, the term of this patent is extended or adjusted under 35 U.S.C. 154(b) by 152 days.

This patent is subject to a terminal disclaimer.

(21) Appl. No.: 12/018,059

(22) Filed: Jan. 22, 2008

(65) Prior Publication Data

US 2008/0181408 A1    Jul. 31, 2008

Related U.S. Application Data

(63) Continuation of application No. 09/874,795, filed on Jun. 5, 2001, now Pat. No. 7,328,350.

(60) Provisional application No. 60/280,629, filed on Mar. 29, 2001.

(51) Int. Cl.
*G06F 21/00* (2013.01)

(52) U.S. Cl.
USPC ............................ 380/277; 713/182; 235/379

(58) Field of Classification Search
USPC .................................................. 380/277–283
See application file for complete search history.

(56) References Cited

U.S. PATENT DOCUMENTS

| 3,798,605 | A | | 3/1974 | Feistel |
| 4,614,861 | A | | 9/1986 | Pavlov et al. |
| 5,029,207 | A | * | 7/1991 | Gammie .................... 380/228 |
| 5,124,117 | A | | 6/1992 | Tatebayashi et al. |
| 5,148,479 | A | | 9/1992 | Bird et al. |
| 5,206,905 | A | | 4/1993 | Lee et al. |
| 5,375,169 | A | | 12/1994 | Scheidt et al. |
| 5,475,756 | A | | 12/1995 | Merritt |
| 5,491,752 | A | | 2/1996 | Kaufman et al. |

(Continued)

FOREIGN PATENT DOCUMENTS

| WO | WO 99/25086 A2 | 5/1999 |
| WO | WO 00/30285 A1 | 5/2000 |

OTHER PUBLICATIONS

Hoover, D.N. et al., "Software Smart Cards via Cryptographic Camouflage," Proceedings of the 1999 IEEE Symposium, 9 pages, 1999.
"CKM Technology Overview," TecSec, Incorporated, 30 pages, 2001.

(Continued)

*Primary Examiner* — Joseph P. Hirl
*Assistant Examiner* — John B King
(74) *Attorney, Agent, or Firm* — Vierra Magen Marcus LLP (57) ABSTRACT

A confidential datum, such as a private key used in public key signature systems, is secured in a digital wallet using a "generation camouflaging" technique. With this technique, the private key is not necessarily stored in the digital wallet, not even in an encrypted form. Instead, the wallet contains a private key generation function that reproduces the correct private key when the user inputs his or her pre-selected PIN. If the user inputs an incorrect PIN, an incorrect private key is outputted. Such private key can be configured so that it cannot be readily distinguished from the correct private key through the use of private key formatting, and/or the use of pseudo-public keys corresponding to the private key. The techniques described herein are also applicable to other forms of regeneratable confidential data besides private keys.

20 Claims, 8 Drawing Sheets

(56) References Cited

U.S. PATENT DOCUMENTS

| | | | |
|---|---|---|---|
| 5,590,197 | A | 12/1996 | Chen et al. |
| 5,606,615 | A | 2/1997 | Lapointe et al. |
| 5,614,927 | A | 3/1997 | Gifford et al. |
| 5,623,546 | A | 4/1997 | Hardy et al. |
| 5,651,066 | A | 7/1997 | Moriyasu et al. |
| 5,668,876 | A | 9/1997 | Falk et al. |
| 5,689,566 | A | 11/1997 | Nguyen |
| 5,694,471 | A | 12/1997 | Chen et al. |
| 5,731,575 | A * | 3/1998 | Zingher et al. ............ 235/379 |
| 5,742,035 | A | 4/1998 | Kohut |
| 5,745,756 | A | 4/1998 | Henley |
| 5,757,918 | A | 5/1998 | Hopkins |
| 5,764,766 | A | 6/1998 | Spratte |
| 5,764,890 | A | 6/1998 | Glasser et al. |
| 5,778,065 | A | 7/1998 | Hauser et al. |
| 5,787,173 | A | 7/1998 | Scheidt et al. |
| 5,809,144 | A | 9/1998 | Sirbu et al. |
| 5,878,138 | A | 3/1999 | Yacobi |
| 5,894,519 | A | 4/1999 | Clemot et al. |
| 5,903,721 | A | 5/1999 | Sixtus |
| 5,953,422 | A | 9/1999 | Angelo et al. |
| 6,098,056 | A | 8/2000 | Rusnak et al. |
| 6,170,058 | B1 | 1/2001 | Kausik |
| 6,205,553 | B1 | 3/2001 | Stoffel et al. |
| 6,246,769 | B1 | 6/2001 | Kohut |
| 6,327,578 | B1 | 12/2001 | Linehan |
| 6,408,388 | B1 | 6/2002 | Fischer |
| 6,470,454 | B1 | 10/2002 | Challener et al. |
| 6,826,281 | B1 | 11/2004 | Mentrup et al. |
| 6,947,556 | B1 | 9/2005 | Matyas et al. |
| 6,970,562 | B2 | 11/2005 | Sandhu et al. |
| 7,111,173 | B1 | 9/2006 | Scheidt |
| 7,359,507 | B2 | 4/2008 | Kaliski |
| 7,373,506 | B2 | 5/2008 | Asano et al. |
| 7,454,782 | B2 | 11/2008 | Rajasekaran et al. |
| 7,490,240 | B2 | 2/2009 | Scheidt et al. |
| 7,734,912 | B2 | 6/2010 | Ganesan et al. |
| 2001/0055388 | A1 | 12/2001 | Kaliski |
| 2002/0007453 | A1* | 1/2002 | Nemovicher ............ 713/155 |
| 2002/0071564 | A1 | 6/2002 | Kurn et al. |
| 2002/0071565 | A1 | 6/2002 | Kurn et al. |
| 2002/0071566 | A1 | 6/2002 | Kurn |
| 2002/0073309 | A1 | 6/2002 | Kurn et al. |
| 2002/0095507 | A1* | 7/2002 | Jerdonek ............ 709/229 |
| 2002/0095569 | A1* | 7/2002 | Jerdonek ............ 713/155 |
| 2007/0101120 | A1* | 5/2007 | Patel et al. ............ 713/151 |

OTHER PUBLICATIONS

"Enhancing Security Technologies," TecSec, Incorporated, www.tecsec.com, 5 pages, 2000.

European Patent Application No. 10003454.5, European Search Report, 6 pages, May 27, 2010.

European Patent Application No. 10003453.7, European Search Report, 6 pages, Jun. 4, 2010.

* cited by examiner

METHOD AND APPARATUS FOR SECURE CRYPTOGRAPHIC KEY GENERATION, CERTIFICATION AND USE

CROSS-REFERENCES TO RELATED APPLICATIONS

This application is a continuation and claims the benefit of, commonly assigned U.S. patent application Ser. No. 09/874,795, filed Jun. 5, 2001, entitled "Method And Apparatus For Secure Cryptographic Key Generation, Certification And Use," now allowed, which is a non-provisional of and claims the benefit of U.S. Provisional Patent Application No. 60/280,629, filed Mar. 29, 2001, entitled "Method And Apparatus For Generalized Camouflaging Of Data, Information And Functional Transformations," the entire disclosure of each of which is incorporated herein by reference for all purposes.

FIELD OF THE INVENTION

The invention relates generally to securing an access-controlled datum and, more specifically, to secure cryptographic key generation, certification and use.

BACKGROUND OF THE INVENTION

Cryptographic data security techniques secure data by encrypting the data with a key. The decrypted data can only be recovered using the key. The key is selected to be sufficiently long that a malicious intruder cannot guess the key by exhaustive trial and error, even with the use of substantially large amounts of computing resources. Therefore, the security of the data has been transferred to the security of the key.

In asymmetric cryptographic methods such as RSA, each user holds a matched pair of keys, a private key and a public key. The private key and the public key form a unique and matched pair in that messages (e.g., messages, data, code, and any other digitally representable information including other cryptographic keys or cryptographic representations of information) that are encrypted with the private key can only be decrypted with the public key and vice versa. This one-to-one correspondence between the private key and the public key can be used to create digital signatures for electronic messages and transactions. In order to sign an electronic message, a user could simply encrypt the message with his private key. He would then attach his public key to the encrypted message and send it to the recipient. Alternatively, the user would not attach his public key to the message, but the recipient could look up the user's public key in a directory of public keys. In either case, to verify the signature, the recipient would decrypt the message using the attached public key, and if the decryption is successful, the recipient is confident of the origin of the message.

As described above, the sender would have to encrypt the entire message with his private key to sign it, which is computationally expensive. To address this, it suffices to compute a short hash of fixed length, say 128 bits long, of the message and then encrypt the hash value. If the hash function is a good one, such as MD5, the chances of two distinct messages having the same hash value are extremely small. Therefore, digital signature methods typically compute hashes of messages, and encrypt only the hash value. The encrypted hash value and the public key of the sender are attached to the original message prior to transmission to the recipient. To verify the signature, the recipient would first compute the hash of the received message. If the computed hash value is the same as the decrypted form of the encrypted hash, the recipient is confident of the origin of the message.

In the foregoing, the strength of the signature verification process depends on the recipient's confidence that the public key attached to the message is indeed the public key of the purported owner. Anybody who can generate a matched pair of keys can masquerade as the user, unless there exists a means to prevent such a masquerade. To this end, public keys are often certified by third-party notaries called certifying authorities or CAs for short. Examples of certifying authorities are commercial entities such as Verisign and Entrust. The CA binds a certifiee's public key with the certifiee's identity, and then signs the combined message with the CA's private key, to form the certifiee's public key certificate. Thus, a certificate holder would attach his public key certificate to the encrypted message prior to sending the message to the recipient. To check the sender's identity and the authenticity of his public key, the recipient verifies the CA's signature on the sender's public key certificate, using the CA's public key. Since there would only be a small number of widely trusted CAs, the CA's public key would be reliably and easily available to the recipient. Thus, public key signatures can be used for stranger-to-stranger authentication in that even if the recipient and the sender have no prior relationship, the recipient can verify the sender's signature as long as the recipient and the sender both trust a common CA.

The uniqueness and unforgeability of a user's signature depend very strongly on the ability of the user to keep his private key private. Anybody who has access to the private key of a user can masquerade as that user with complete anonymity. Hence, widespread use of digital signatures for electronic commerce and other applications will require technology for the secure storage of private keys. At present, it is widely believed that private keys are best stored by physically isolating them on hardware devices such as smart cards, Fortezza cards, PCMCIA cards and other compact hardware devices. Smart cards are credit-card sized cards that contain a microprocessor and some memory. The user's private key and public key certificate are written onto the memory. To use the card, the user would simply insert the card into an appropriate card reader connected to a host computer, and then enter his PIN to activate the card. If the correct PIN were entered, the on-card processor would release the private key for use on the host computer. If an incorrect PIN were entered, the processor would not release the user's private key. Some tamper-resistant smart cards are configured so that if incorrect PINs are entered on several consecutive activation attempts, the card locks up permanently. Some sophisticated smart cards (often called cryptocards) can perform cryptographic operations, so that the private key need never leave the smart card. The bytes to be processed enter the smart card from the host computer, are processed, and are then transmitted back to the host computer. Unfortunately, even cryptocards must rely on the host computer for transmitting the bytes back and forth from the card reader and are therefore not perfectly secure. A malicious host computer could simply substitute one message for another prior to transmission, so that the user thinks he is signing one message, while in fact he is signing another. Therefore, even existing cryptocards cannot completely protect the cardholder (e.g., against malicious host computers).

While the smart card solves the problem of securely storing private keys, it suffers from several significant drawbacks:

1) High Initial Cost: Smart cards require expensive additional hardware infrastructure in the form of smart card readers;
2) Administrative Overhead: Smart cards require administrative overhead for distribution and upkeep; and 3) Low User Convenience: The user cannot duplicate, backup or collate smart cards, owing to their tamper proof features.

A secure software-based key wallet that does not require additional hardware would mitigate some of the drawbacks of the smart card listed above. The standard technology that is used today for key storage, in products such as those of Microsoft and Netscape, offers very little protection against tampering, and can be broken into rather easily. Specifically, these key wallets store the private key in encrypted form, using the user's PIN as the encryption key. The PIN must be short enough for the user to remember, say a six-digit code. If such a software key wallet falls into the hands of a hacker, the hacker could exhaustively try all one million possible six-digit codes in an automated fashion on a personal computer within a few minutes, until he finds the code that opens the key wallet. At this point, the hacker knows that he has exactly the correct PIN, and has access to the user's private keys. Thus, the primary problem with providing a software-only key wallet are the competing requirements that the PIN be short enough for the user to remember, but long enough to make the key wallet tamper resistant.

BRIEF SUMMARY OF THE INVENTION

Various embodiments of the invention address the above-described problems using a technique which we shall refer to as "generation camouflaging." In generation camouflaging, the key is not necessarily required to be stored, not even in its encrypted form.[1] Instead, this technique employs a private key generation function that reproduces the correct private key when the user inputs his PIN. If the user inputs an incorrect PIN, a wrong private key is produced. We refer to private keys protected in this manner as being "generation camouflaged." As a result, a malicious intruder who obtains the software (e.g., steals the key holder's key wallet) using the generation camouflaging technique will not have access to any form of the private key, encrypted or un encrypted, when trying to guess the correct PIN. In one exemplary embodiment of a key wallet using generation camouflaging, the malicious intruder will find it virtually impossible to guess the correct PIN by looking at the resulting private key, because for every (or virtually every) possible PIN, a valid-looking private key is produced.

[1] Although some embodiments of the technology could also store a representation of the private key, as a matter of convenience and/or depending on the specific circumstances at hand. However, the regeneration of the private key can occur without dependence on the stored form of the private key. In some embodiments, the generation camouflage system might be configured to store part of a user's key (or other datum) and camouflage a part of a user's key (or other datum). During reconstruction, the first part would be regenerated, the second part would be recalled from memory, and the two parts would be combined to form a composite datum that collectively reconstitutes the user's key (or other datum). Thus, as used herein, references to "generation," "regeneration," or "generation camouflage" should be understood to include operations on all or part of a user's datum.

The generation camouflaging technique employs a private key generation function that produces a private key output based on an input seed value. If the input seed value matches the seed value that was originally used to produce the user's private key, the user's private key is, of course, reproduced. However, a different seed value will produce a different private key.

In one embodiment, the input seed value is derived from an input PIN value based on an exclusive-OR operation. The input PIN and a stored value (which is derived from the seed value that was originally used to produce the user's private key) undergo the exclusive-OR operation such that, when the correct PIN is input, the input seed value matches the original seed value. Consequently, the private key generation function, having the original seed value provided thereto as an input, reproduces the user's private key.

In other embodiments, the input seed value is derived from other types of relationships with the input PIN.

In this specification, we discuss an exemplary application of securing private keys in a "key wallet," compatible with existing public key signature methods such as RSA, DSS, El-Gamal, elliptic curve cryptosystems, and their associated key generation, verification and certification technologies.

A key wallet may be implemented as a software wallet, which the user would unlock, using a PIN, in much the same way as he would use a smart card. Depending on the particular configuration deployed, the advantages of a software-based wallet scheme may include some or all of the following:

1) Low Cost: The system does not necessarily require additional hardware infrastructure. The wallet can be embodied in any digital storage medium including floppy disks, hard disks, magnetic stripe cards, and even smart cards themselves;
2) Low Administrative Overhead: The wallet can be distributed electronically and updated electronically as required;
3) High User Convenience: The user can duplicate, backup, and collate wallets. Wallets can also be transmitted electronically;
4) Tamper Resistance: The wallet can be tamper resistant in functionally the same sense as a smart card; and
5) No Undue Burden on User: The user's experience with the wallet would be the same as that with the smart card, and the user would not require unusually long PINs, or require extreme care in entering PINs, etc.

Of course, although there are many advantages to a software-only implementation, parts or all of the system could even be implemented in a combination of hardware and software, or even purely in hardware, providing great flexibility for deployment and usage.

The foregoing and the following detailed description describe an exemplary implementation of generation camouflaging, directed at secure generation of private keys using a PIN. Those skilled in the art will realize, however, that the techniques disclosed herein are usable generally for secure storage of any access-controlled datum (ACD) using any digitally representable access code. Therefore, the term key wallet (or, alternatively, digital wallet) should be understood generally to refer to any device for securing generation camouflaged access-controlled data, rather than only the exemplary embodiments described herein.

Finally, optional features related to generation camouflaging pertain to the creation and management of public-key certificates usable with the above key wallet. Such features may include:

1) Limited liability: The public key may be pseudo-public, with its use being limited explicitly to authorized verifiers who are authorized by the certifying authority. This could also, as a practical matter, limit the legal liability of the certifying authority.
2) Certificate Revocation: If public-key certificates are created which are only useful to authorized verifiers, then revocation of the certificates is facilitated to the extent that only the authorized verifiers need to be notified of the cancellation of a certificate, as will be explained in detail below.

Persons skilled in the art will recognize that applications of generation camouflaging include, but are not limited to: (a) strong authentication for secure remote/local access to computing and storage resources; (b) reduced user sign-on in environments with multiple computers on a network; (c)

strong authentication for secure access through firewalls with or without the IPSEC network protocol; (d) digital signatures for secure electronic commerce transactions; (e) digital signatures for electronic payment mechanisms; (f) secure access to databases and/or digital signatures for database transactions; (g) secure access to routers and network switches; (h) secure access to distributed services; and/or (i) embedded applications where the user (e.g., of the digital wallet) is represented by a computational agent, such as a program running in software or hardware, as applied to, but not limited to, any of the aforementioned applications.

DETAILED DESCRIPTION OF THE INVENTION

While the discussion that we will present is in the exemplary context of securing private keys for digital signatures, those skilled in the art will readily recognize that the technique of generation camouflaging can be used to secure other forms of data.

Figure 1:
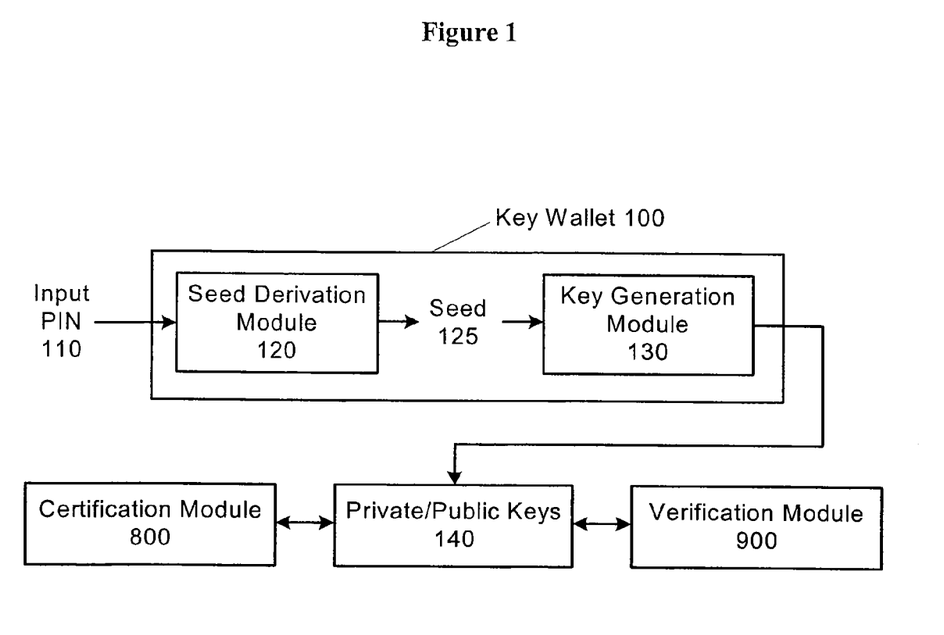
FIG. 1 is a schematic overview of a cryptographic key wallet and seed and key generation, key certification, and verification subsystems.

FIG. 1 gives a schematic overview of functional elements of an exemplary "generation camouflage" system which includes key private key initialization (not shown in FIG. 1), private key generation (or regeneration), public key certification, and verification aspects. Of course, actual embodiments could include some or all of these aspects, depending on the circumstances of how the system is deployed.

As in conventional cryptographic systems, the initialization of a private key occurs via a seed-based process. In particular, a private key (and its corresponding public key, in accordance with a specified relationship between private and public keys appropriate to the particular cryptographic protocol in use) is generated as a function of a seed using known key generation protocols such as those described in Schneier, *Applied Cryptography*, Wiley, 1996 and Menezes, *Handbook of Applied Cryptography*, CRC Press, 1997.

For enhanced security, the seed is preferably random or pseudo-random. The seed can be of any length, depending on the security requirements of the system. Typical seeds currently range from 8 bytes to 20 or more bytes. It is easy to modify a key generation function that expects a longer seed so that it accepts a shorter seed, by padding the shorter seed. If the padding is fixed (for a given wallet), the generation is reproducible: the same input seed will produce the same output key(s).

The initialized private key is provided to the key holder for use in performing digital signatures. In conventional key cryptographic systems, the private key (or some form thereof) is stored in the key holder's key wallet under protection of a PIN. When the key holder inputs the PIN, the private key is released for use; if an incorrect PIN is entered, nothing is released. Storage of the private key in the key wallet, and/or its release only upon entry of the correct PIN leads to certain security risks associated with to conventional key management systems.

In the various embodiments of the invention disclosed herein, the private key is not necessarily stored in the key wallet, not even in an encrypted form. Rather, the user's key wallet contains a module that also allows it to regenerate the private key as needed by the user. More particularly, the key wallet first re-derives the original seed used to create the user's private key, then uses the derived seed to regenerate the private key.

FIG. 1 discloses a key wallet 100 receiving an inputted PIN 110. The PIN 110 is sent to a seed derivation module 120 which uses a stored representation of the original seed, or a known relationship between the original seed and the correct PIN, that can be used to derive a seed from the inputted PIN. If the inputted PIN is the original PIN, the derived seed is the original seed. If the inputted PIN is not the original PIN, the derived seed is not the original seed. In either case, the derived seed is sent to a key generation module 130 containing similar key generation functionality as was used to initialize the user's private key from the original seed. Thus, if the correct PIN is entered, the original seed is reproduced and the user's private key is regenerated. However, if the incorrect PIN is inputted, an incorrect seed is produced, and an incorrect private key is generated. In this fashion, the aforementioned seed derivation and key generation mechanisms effectively camouflage the private key against unauthorized personnel (such as hackers) while allowing access and use by the key holder. We refer to a private key protected in such a fashion as being "generation camouflaged" and to the techniques therefor as "generation camouflaging."

As stated above, generation camouflaging uses a seed derivation module that has access to either a stored representation of the original seed, or a known relationship between the original seed and the correct PIN. Various embodiments of seed derivation modules are described in greater detail in the "Key Wallet" section below.

The key wallet can also be configured to output keys in forms and/or formats in a manner resistant to certain kinds of attacks, as described in the "Attacks on Key Wallets and Responses Thereto" section below.

Finally, key wallet 100 can be used in connection with a certification module 800 and/or a verification module 900 for added security against still other types of attacks. Certification module 800 is used to certify the public key corresponding to the private key, and verification module 900 is used to verify signatures created by the private key. The certification and verification modules are described in greater detail, respectively, in the "Certification Module" and "Verification Module" subsections below.

1. Key Wallet

Figure 2:
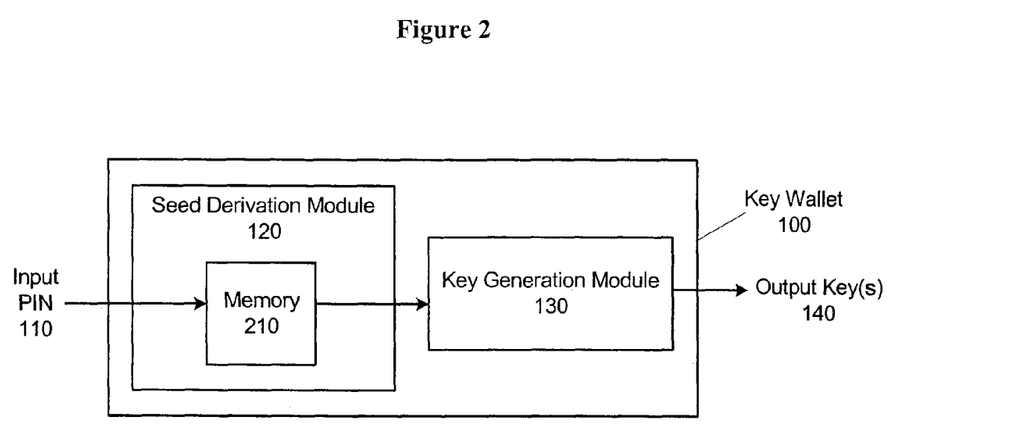
FIG. 2 illustrates a first embodiment of a key wallet that implements the generation camouflaging technique.

A first embodiment of the generation camouflaging technique is depicted schematically in FIG. 2. FIG. 2 illustrates a key wallet including a seed derivation module 120 including a memory 210 (which may include a hardware memory, for example RAM, or a software memory such as a buffer or other data storage field) in which an input PIN 110 is temporarily stored after being input by the user is stored. In this embodiment, the stored relationship between the seed and the PIN may be regarded as a unit (or multiply-by-one) function that is effectively implemented by passing the seed through memory 210. Thus, the key generation module 130 uses the PIN itself as the seed to produce output key(s) 140. The key generation function would, therefore, typically accept a seed of the same length as the PIN.

The key generation function 130 may be, for example, a key generation function for DES or any other symmetric cryptography system, or a private key generation function for RSA or any other asymmetric key signature system. Of course, the key generation function could be any other data generation function where the quantity being generated is not a cryptographic key. Those skilled in the art will recognize that the function 130 need not be limited to a function for generating confidential data or information in the field of cryptography, but may also include a function that generates confidential data or information in any other technical field.

Figure 3:
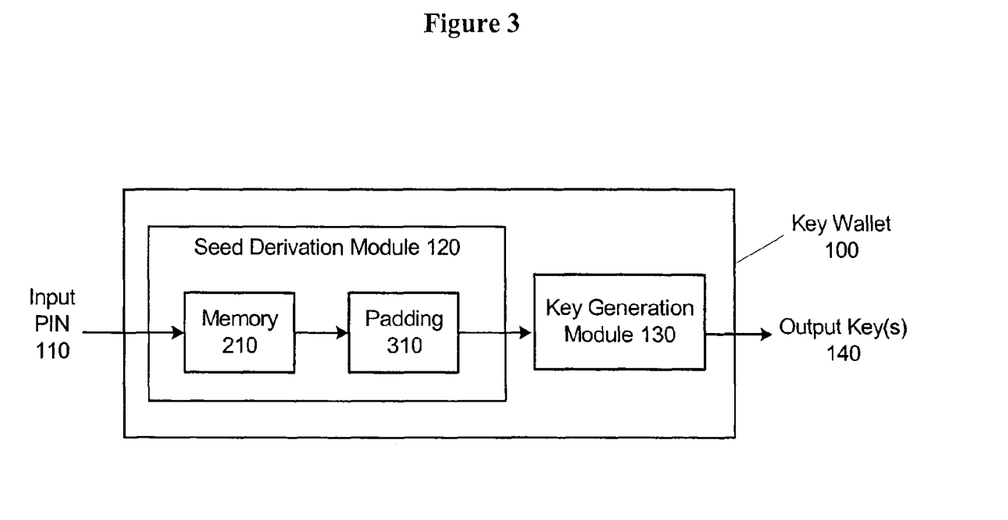
FIG. 3 illustrates a second embodiment of a key wallet that implements the generation camouflaging technique.

FIG. 3 illustrates a key wallet that implements the generation camouflaging technique according to a second embodiment of the invention. In this embodiment, seed derivation module 120 includes a memory 210 and a padding module 310. This combination is used where the seed is essentially the PIN (as in the first embodiment), although padding is required because the seed is longer than the PIN. For example, a typical PIN is of a reasonable length that can be easily remembered by the user. In many applications, the PIN is 4-6 bytes long. However, an input value to a typical confidential data generation function is often much longer for purposes of spreading out the valid confidential data among many invalid ones. In the second embodiment, the padding function may simply add zeroes to the PIN (or otherwise pad the PIN) so that the resulting number will have the requisite number of bytes to serve as the input seed value to the key generation function 1330. More generally, those skilled in the art will appreciate that the memory 210 and padding module 310 in seed derivation module 120 could be replaced by other modules representing a single function or a plurality of functions.

Figure 4:
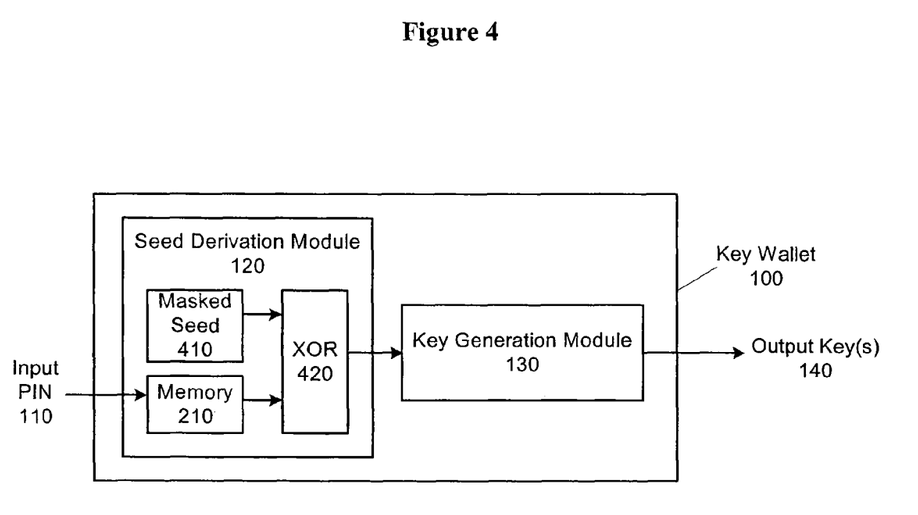
FIG. 4 illustrates a third embodiment of a key wallet that implements the generation camouflaging technique.

FIG. 4 illustrates a third embodiment of a key wallet that implements generation camouflaging. The third embodiment has specific application to the RSA or any other asymmetric signature system. In this third embodiment, the seed derivation module includes an exclusive-OR ("XOR") function 420. The XOR function operates on two inputs, an input PIN value (pin) stored in a first memory 210 and a masked value (seed$_{masked}$) (i.e., a stored representation of the original seed) stored in a second memory 410, to generate the input seed value (seed) to a key generation module 130. The boolean expression for deriving the seed is:

$$\text{seed} = \text{pin XOR seed}_{masked},$$

with the masked seed value (seed$_{masked}$) representing a relationship between the valid PIN and the original seed given by:

$$\text{seed}_{masked} = \text{pin}_{valid} \text{ XOR seed}_{orig},$$

where valid_pin is an authorized valid PIN, and seed_orig is the original seed to the generation function which produced the correct private key. Thus, when the valid PIN is supplied as the input PIN, the exclusive-OR operation on the masked seed value (seed$_{masked}$) unmasks the original seed value (seed$_{orig}$), and the key generation module 130 reproduces the correct private key. On the other hand, when an incorrect PIN is supplied as the input PIN, the exclusive-OR operation fails to unmask the original seed value, and the private key generation function 130 produces an incorrect private key.

In certain implementations of the above example, the PIN value may be only 4-6 bytes long, whereas the seed values may be as long as 20 bytes. Therefore, there may be a mismatch of byte size when the XOR operations are performed. In such cases, it is understood that the PIN value can be XORed with an initial or final or other segment of the seed, leaving the rest of the seed untouched.

Further, the private key generation function may be a stand-alone private key generation function or it may be a function that generates a matching pair of public and private keys. In the latter case, the public key output need not be used.

The third embodiment described above permits changing of the user-selected PIN. When a user changes his PIN, a new masked seed value is stored in the second memory 410. The new masked seed value may be based, for example, on the following boolean relationship:

$$\text{seed}_{masked\_new} = \text{pin}_{valid\_new} \text{ XOR pin}_{valid\_old} \text{ XOR seed}_{masked\_old}$$

In the foregoing examples, an XOR function is used to perform the masking of the seed. However, those skilled in the art will readily appreciate that other functions may also be used, so that masking should generally be understood to include storage of the seed in a form from which the seed can be reproduced using an operation involving a PIN.

Figure 5:
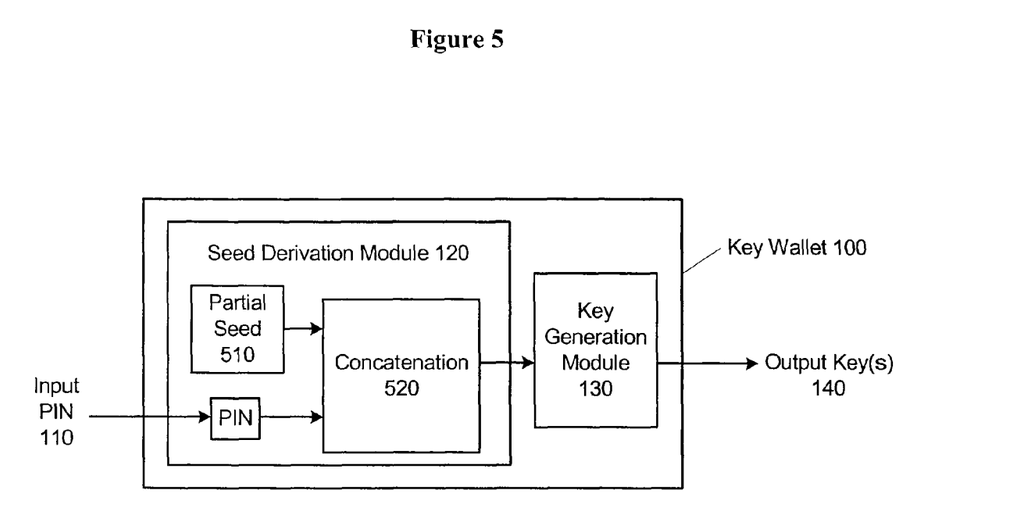
FIG. 5 illustrates a fourth embodiment of a key wallet that implements the generation camouflaging technique.

FIG. 5 illustrates a fourth embodiment of the invention. In this embodiment, the user-entered PIN (valid_pin) of byte length m is an initial segment of the seed, and the remainder of the seed is stored in the key wallet at memory 210 along with a concatentor 520 and a key generation module 130. When the user enters an input PIN (pin), the concatenator 520 concatenates the input PIN to the stored remainder to produce the input seed value to the key generation function 130. When the user's correct PIN is entered, the original seed value and thus the correct private key value are reconstructed. On the other hand, when the wrong PIN is entered, a different seed value and thus an incorrect private key are produced.

Those skilled in the art will readily appreciate that all of the foregoing (and many other) private key generation functions and seed derivation techniques can be used in conjunction with generation camouflaging techniques. In addition, although the exemplary embodiments have been described in the context of private key generation using a PIN, those skilled in the art will realize that the techniques disclosed herein are applicable to camouflaging virtually any confidential datum, using passwords or any user-held access codes. It is therefore intended that the scope of the invention not be limited to the particular embodiments disclosed herein, but rather to the full breadth of the claims appended hereto.

2. Attacks on Key Wallets and Responses Thereto

We now enumerate the kinds of attacks which hacker may mount on digital key wallets, and means to resist such attacks. In the interest of clarity, the discussion will be set forth with respect to the RSA public key signature system. However, those skilled in the art will appreciate that the basic elements of the discussion are applicable to other systems as well, cryptographic and non-cryptographic, where a confidential data is generated by a special function.

a. Brute Force Attack

When a malicious hacker gets a copy of a conventional key wallet, the hacker simply tries every combination of possible PINs until a private key is released. Since in a conventional key wallet, a private key is released only when the correct PIN is input, the hacker will know that the PIN that released the private key is the correct PIN. To resist this type of attack, the key wallet may be configured to always release some quantity in response to any input PIN (or, in any event, releasing a quantity in response to a significant number of input PINs, instead of releasing only upon entry of the correct PIN). In addition (as discussed below with respect to Ill-Formed Key Attacks), the key generation module may be configured so that its output appears in the proper form of a private key.

b. Ill-Formed Key Attack

Another attack is one in which the malicious hacker tries all possible PINs and examines the form of the resulting private key. If the resulting private key is not well formed, the hacker knows that the PIN producing such private key cannot be the correct PIN. Thus, the above-described embodiments of key generation modules may be configured to always produce well-formed keys, and as a result, the hacker cannot examine the well-formedness of the key to arrive at the correct PIN. Private key generation functions that generate well-formed keys in RSA and other public key encryption systems are well known and will not be discussed in further detail. Characteristics of (and, therefore, techniques for producing) valid-looking private keys are well known in the art (see, e.g., a description of private key formats in Schneier, Menezes, and U.S. Pat. No. 6,170,058, which is hereby incorporated by reference) and need not be discussed in detail.

c. Known Public Key Attack

Figure 6:
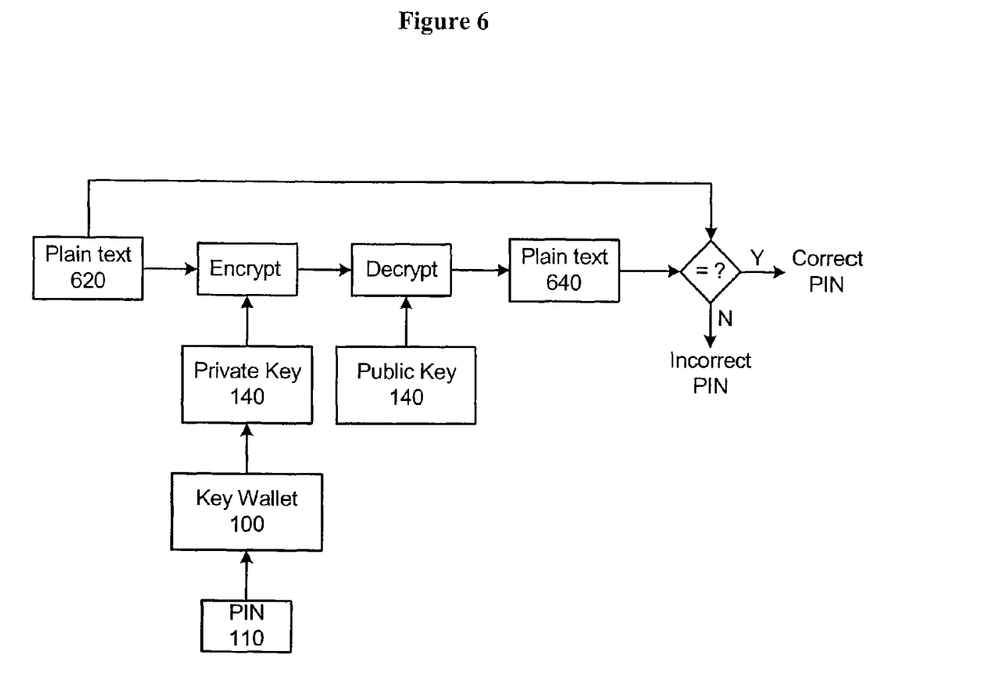
FIG. 6 illustrates a known public key attack that is addressed by a pseudo-public certificate.

In this attack, the malicious hacker has access to two pieces of information: (a) the user's key wallet, and (b) the user's public key, as might be readily available in a public key certificate directory. The attack is shown pictorially in FIG. 6. The hacker will try all possible PINs 110 on the key wallet 100. For each PIN, he would use the outputted private key 610 to encrypt an arbitrarily chosen sample message 620, and then decrypt the encrypted message with the user's public key. If the decrypted message 630 matches the original sample message 620, the hacker knows that he has discovered the correct PIN and regenerated the user's correct private key.

To resist this attack, one embodiment of generation camouflaging does not permit public keys to be truly public. As a matter of convenience, we shall call such limited-distribution public keys "pseudo-public keys" and we shall call certificates containing such pseudo-public keys "pseudo-public certificates." Specifically, pseudo-public certificates contain the user's pseudo-public key in encrypted form. Only authorized parties can access a pseudo-public key to verify the user's signature. This is in contrast with the conventional use of public key certificates, where anybody can verify a public key signature. Of course, the key wallet and other aspects or embodiments of the present invention could be used with conventional certificates alone, but even greater security is provided if pseudo-public keys and certification are also used, as described herein. Those skilled in the art will readily appreciate that existing certification issuance devices and procedures may readily be adapted to accommodate the foregoing embodiment of the present invention. Therefore, the specific hardware and/or software implementations of this embodiment of a certification module need not be described in detail. Rather, only the differences from the conventional certificates will be described below. Readers skilled in the art will recognize that conventional certificates come in several formats, most notable of which is the X.509 format and its revisions; however, the essential elements of all the conventional formats are similar, when viewed in relation to the present invention.

Pseudo-public keys, in turn, implicate pseudo-public key certification and pseudo-public key verification techniques. Exemplary embodiments therefor are described below.

i. Certification Module

Referring again to FIG. 1, one embodiment of a certification module 130 usable in combination with a generation camouflaging key wallet creates public key certificates that are somewhat different from the conventional public key certificates. Essentially, public keys as used herein are not truly public as with conventional methods, but are meant for limited distribution (e.g., within organizations, across intranets or otherwise within closed or pseudo-public enterprises).

Figure 7:
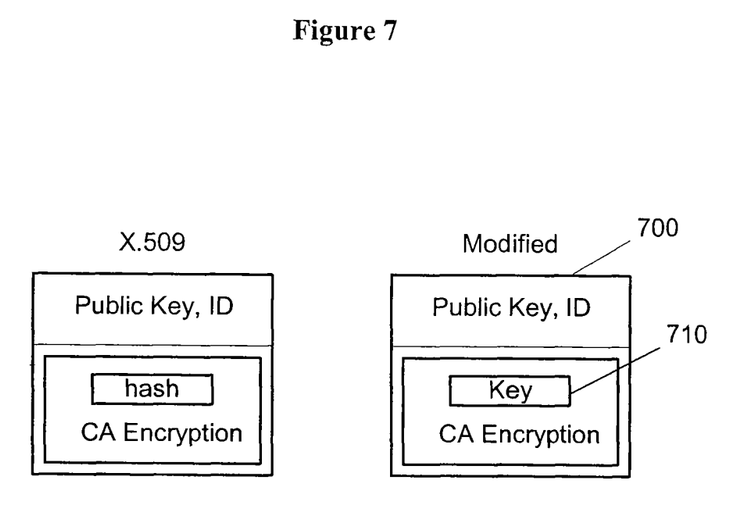
FIG. 7 illustrates a conventional and an exemplary pseudo-public certificate.

A conventional public key certificate and one possible embodiment of a pseudo-public certificate are shown side by side in FIG. 7. The conventional certificate includes the user's identifying information, the user's public key, and a certificate authority's (CA's) signature of the user's public key, the signature comprising an encryption, under the CA's private key, of a hash of the user's public key.

The exemplary pseudo-public certificate may have the same format as the conventional certificate. However, the body of the certificate 700 containing the pseudo-public key is encrypted in a manner that is readable only by an authorized verifier. For example, in one implementation, the encryption could be performed under the public key of the authorized verifier. Only authentication servers that have access to the corresponding private key can unwrap the user's certificate to access the user's public key. If there are several authorized verifiers, the body of the certificate could carry several encrypted copies of the pseudo-public key, each copy being encrypted by the public key of one of the verifiers. Each enterprise or entity employing this approach would have a certificate server having the above-described certification module to support its pseudo-public certificates. Those skilled in the art will appreciate that configuration of the pseudo-public certificate, so that the public key is encrypted and can be decrypted only by authorized verifiers, may be achieved in many different ways using a variety of cryptographic algorithms. For example, in an alternate embodiment of the pseudo-public key certificate, the public key would be encrypted by a DES key, and the DES key would be encrypted by the public key of the authorized verifier.

The resulting certificate would then be signed by the certifying authority similar to a conventional certificate. It is the pseudo-public nature of public keys that provides for two potential advantages in key management. Firstly, since the certifying authority is explicitly aware of who is authorized to use the public-key certificates, the legal liability of the CA could, as a practical matter, be limited. This is in contrast to the conventional certificate where the CA has no prior knowledge of who will use the certificate. Secondly, revoking a public-key certificate is facilitated, since the CA only has to notify those verifiers authorized to use the public-key certificates.

Figure 8:
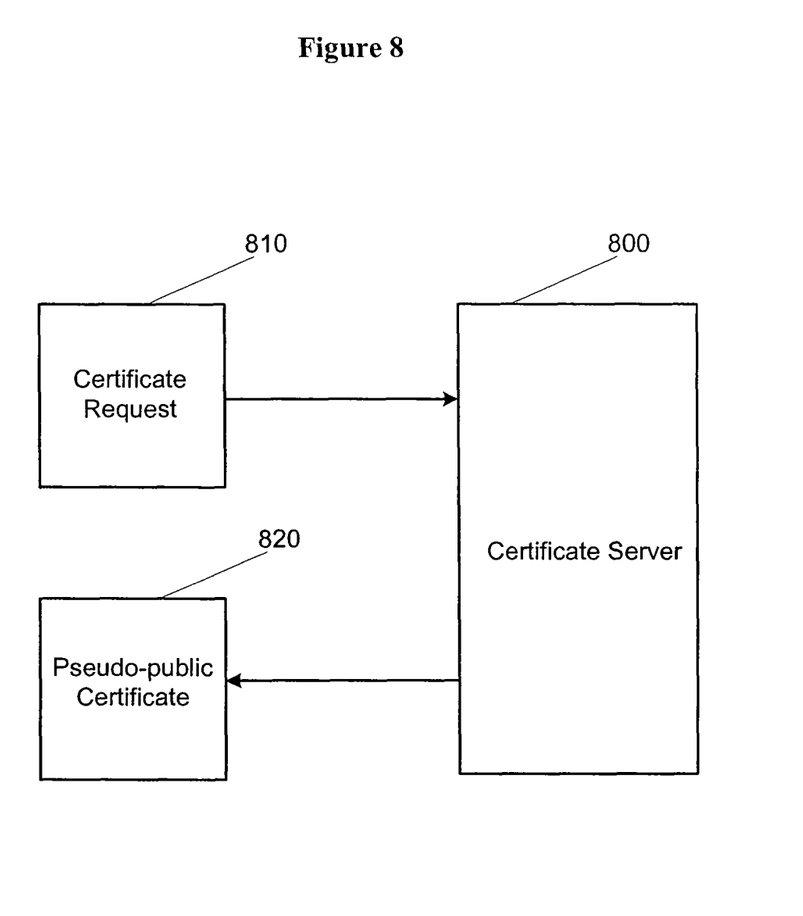
FIG. 8 illustrates an exemplary certificate server embodiment.

Certificates of the proposed form will be issued by the certification module, acting as a certificate server as shown in FIG. 8. As those skilled in the art will appreciate, the certificate server comprises a series of modules that can be implemented in software, hardware, or a combination thereof. The user who wishes to be certified submits a digitally signed request for such as input 810 to the certificate server 800. Such a request would typically contain the user's public key that is to be certified, along with his name or other identifying attributes. The certificate server would verify the user's digital signature using the submitted public key. If the signature verifies correctly, the server would check the user's identity information in a database, and then issue a public key certificate 820 of the proposed form as output. Those skilled in the art will recognize that the user identity database could be supplanted by other sources of information to verify the identity of the user requesting the certificate.

An alternate realization of the pseudo-public certificate server could involve a modification unit to be attached to a conventional certificate server. Such an add-on unit could operate on the input or the output of the conventional certificate server. In the event the modification unit operates on the input, it would repackage the request for the certificate by encrypting the users public key, and embed the encrypted public key among the identification attributes. The modification unit would then attach a dummy public key to the request, sign the request with the associated private key and pass on the request to the conventional certificate server. The output of the conventional certificate server would be a certificate containing the encrypted public key of the user as one of the identifying attributes. In the event the modification unit operates on the output of a conventional certificate server, the unit would repackage the conventional certificate produced by the conventional certificate server by encrypting the public-key exponent in the certificate in situ, and then overwriting the signature of the certificate server with a fresh signature of the modified certificate. Persons skilled in the art will appreciate that still other alternative embodiments are possible.

ii. Verification Module

Certification of a pseudo-public key by a CA results in the creation of pseudo-public certificates for distribution to parties communicating or conducting transactions with the holder of the private key corresponding to the pseudo-public key. Such parties will desire to verify pseudo-public keys received from unknown private key holders prior to relying on the pseudo-public keys for decrypting messages encrypted with the corresponding private keys.

Referring again to FIG. 1, one embodiment of a verification module 120 usable in combination with pseudo-public keys and certificates is disclosed. The verification module differs in two ways from the verification module in conventional systems. The verification module respects the pseudo-public nature of the public key certificate, and takes appropriate steps to extract a user's public key from the certificate before verifying the user's signature. In an exemplary embodiment, these would include receiving a certificate containing an encrypted pseudo-public key of the certificate holder, and using the private key of an authorized verifier to decrypt the pseudo-public key. The verification module would then use the pseudo-public key to verify a digital signature in a message sent by the certificate holder. In an alternative embodiment, if a DES key had been used to encrypt the pseudo-public key, the DES key would first be decrypted using the private key of the verifier, and in turn the DES key used to decrypt the pseudo-public key. No matter what the decryption mechanism, the verification module may also include logic to detect break-in attempts by fraudulent hackers, e.g., those signing messages with incorrect candidate private keys corresponding to the incorrect access codes of the key wallet. In such a case, a fraudulent hacker might steal or otherwise obtain the legitimate user's pseudo-public certificate and send the certificate along with a fraudulent message signed with the incorrect candidate private key. The inconsistency between the legitimate user's correct pseudo-public key in the certificate and the incorrect candidate private key allows detection of the fraudulent user. In particular, in one embodiment, if a particular user's signature is not verified in three successive attempts, the verification module concludes that a break-in might be in progress, and freezes the user's access privileges pending further investigation. In addition to (or instead of) freezing the access, the verification module might sound an alarm alerting an operator of the attempted break-in. There are other methods of detecting break-in attempts at the verification module, and other possible courses of action upon detecting a break-in. As those skilled in the art will appreciate, the verification module will compromise a series of logic modules that can be implemented in software, hardware, or a combination thereof.

3. Modifications, Enhancements and Alternate Embodiments

The foregoing has described various aspects of generation camouflaging. Although in one exemplary embodiment, the key wallet, the seed and key generation module, the key verification module and the key certification module are all used together to provide a secure technology for cryptographic key storage and use, those skilled in the art will appreciate that in alternative embodiments, various subsets of the whole system may also be combined for particular applications not requiring all of the modules.

In addition, although the foregoing has been described with respect to an exemplary software-based system, this is not strictly necessary. For example, some or all of the modules could be deployed using microcode and PLAs or ROMs, general purpose programming language and general purpose microprocessors, or ASICs. That is, the techniques described herein are not limited to software per se, but could be deployed in virtually any form of logic, including pure software, a combination of software and hardware, or even hardware alone.

The key wallet may be carried by the user or, alternatively, stored remotely and downloaded over a network to a user "on the fly" using "roaming" techniques such as those disclosed in pending U.S. patent application Ser. No. 09/196,430, filed on Nov. 19, 1998, now U.S. Pat. No. 6,263,446, issued Jul. 17, 2001, which is hereby incorporated by reference.

In addition, although various embodiments or aspects have been described with regard to RSA cryptography (for the public and/or pseudo-public keys and public and/or pseudo-public certificates) or DES cryptography (for the PIN encryption and storage of the pseudo-public key on the pseudo-public certificate), those skilled in the art will appreciate that many modifications and enhancements to such exemplary cryptographic technology are possible. More generally, each of the aforementioned operations can be implemented from a broad choice of cryptographic techniques, including many kinds of asymmetric or symmetric encryption as well as CRCs, hashes, message digests, or other one-way functions. For example, an asymmetric encryption operation could be replaced with a (optionally keyed) one-way function where integrity is the primary concern, or encryption of a symmetric session key followed by use of the session key for plaintext encryption, and various other alternatives that are well-known to those skilled in the art.

Furthermore, in many applications, the inputted PIN is about 4-6 bytes and is typically smaller than the seed value. However, it is also possible that the seed value may be smaller than the PIN value. This could be accommodated, for example, by doing a many-to one hash of the PIN, and using this smaller byte sequence as the seed. Thus, there is no absolute requirement as to the relationship between the seed length and the PIN length. Rather, this relationship is determined by the choices and requirements of the system as deployed.

Also, although the exemplary embodiment has been described with respect to PINs protecting a private key, those skilled in the art will realize that the same technology of generation camouflaging can be used with other types of access codes and cryptographic representations to protect any regeneratable access-controlled datum. For example, the exemplary embodiments disclosed in this specification rely on the seed derivation module having access to a stored representation of the original seed used to create the private key, or a known relationship between the original seed and the user's PIN. However, the system is also operable where the user's private key (or, more generally, an access-controlled datum) was either not based on a seed value or the seed value is not known at the time the generation camouflaging digital wallet is implemented. More particularly, suppose that the access-controlled datum is derivable within the key generation (or, more generally, data generation) module upon receipt of an operand. This is achievable with any one-to-one mapping between the access-controlled datum and the operand where the operand is representable as a function of, and is thus reproducible from, the user's PIN using the seed derivation module.

As a first example using the XOR seed derivation module functionality disclosed above, the seed derivation module would store a operand$_{masked}$=pin XOR operand, so that the operand is derivable as operand=operand$_{masked}$ XOR pin. The other exemplary embodiments of seed derivation module functionality (e.g., operand=pin with or without padding) are also usable for this purpose. The foregoing shows that the operand is functionally equivalent to the "seed," and the one-to-one mapping between the operand and the access controlled datum is functionally equivalent to the seed-based key generation routine in the key generation module. Thus, the term "seed" should not be limited exclusively to a quantity that was used to initialize the user's private key, but rather to other quantities of the type described in this paragraph. Similarly, the term "key" should not be limited exclusively to a quantity usable for cryptographic operations, but rather to other access-controlled data generally.

As a second example, suppose the PIN (or, more generally, access code) space is of size pinspace_size (e.g., for 6 digit PINs, pinspace_size=1,000,000). The seed derivation module can store up to pinspace_size PINs listed in some order and, for each PIN, a corresponding seed. These PIN-seed pairs would include not only the correct (or initialization) seed corresponding to the correct PIN, but also (some or all) likely values of incorrect seeds corresponding to incorrect PINs. When one enters a PIN to release the key, the PIN is interpreted as an index into the list, and the indexed seed is selected. When one inputs the correct PIN, the correct seed is derived. When one inputs an incorrect PIN, an incorrect seed is derived. The seed is then used as input to the key (or, more generally, data) generation module.

As a third example, consider the second example where, instead of storing seeds corresponding to input PINs, the generation camouflaging wallet directly stores keys corresponding to input PINs without the need for a two step (seed derivation plus key generation) process. This can be regarded as a simplified form of generation camouflage. In the previous discussions, the seed plus PIN plus generation functionality together produce the key. In this example, the list, PIN, and selection functionality produces the key. The generation camouflage mechanism has done away with the explicit seed, by storing the list explicitly, so that the generation routine has been reduced or simplified to a means of selecting an item in a list. In this way, the seed derivation functionality has been merged into the key generation functionality, so that the derived seed is the same as the outputted key. This example can be regarded as a variant of generation camouflage in which a list of data items is stored in the clear, and a PIN is used as an index to select one of the items.

In view of all the foregoing disclosed (and still other possible) embodiments and implementations of the general technique of generation camouflage, it is therefore intended that the scope of the invention be limited only by the claims appended below.

What is claimed is:

1. A digital wallet, secured with a user's access code, comprising:
   (a) a computer-implemented input for receiving an input access code;
   (b) a seed derivation module operatively connected to said computer-implemented input, for deriving a seed using the input access code; and
   (c) a seed-based data generation module that receives said seed and generates at least an output datum,
   wherein said seed-based data generation module is configured such that said output datum corresponds to at least a portion of a confidential datum of said user if said input access code equals said user's access code and said output datum corresponds to a data sequence that is not usable as said at least a portion of said confidential datum of said user if said input access code equals any one of a plurality of access codes not equal to said user's access code, and
   wherein said data sequence has the appearance of said at least a portion of said confidential datum.

2. The digital wallet of claim 1, wherein the value of the output datum varies based on the input access code.

3. The digital wallet of claim 1, wherein generation of said output datum occurs without dependence on any storage of any form of said at least a portion of said confidential datum.

4. The digital wallet of claim 1, wherein the output datum comprises a key.

5. The digital wallet of claim 1, wherein the input access code comprises a PIN.

6. The digital wallet of claim 1, wherein the seed derivation module comprises an exclusive or (XOR) module.

7. A non-transitory computer-readable storage medium having a computer-readable program embodied therein for directing operation of a computer system comprising a communication system, a processor, and a storage device, wherein the computer-readable program comprises instructions for operating the computer system to create an output datum based on an identifier supplied by a user, the instructions further comprising instructions for:
   receiving, from the user, the identifier, wherein the identifier is either a correct identifier or an incorrect identifier of a plurality of incorrect identifiers;
   creating, using the identifier, a seed, wherein:
   the seed is created regardless of the identifier being the correct identifier or the incorrect identifier of the plurality of incorrect identifiers; and
   the value of the seed when the correct identifier is received as the identifier is different from the value of the seed when the incorrect identifier of the plurality of incorrect identifiers is received; and
   creating, using the seed, the output datum, wherein:
   the output datum is created regardless of the correct identifier or incorrect identifier of the plurality of incorrect identifiers being received; and
   the value of the output datum when the correct identifier is received as the identifier is different from the value of the output datum when the incorrect identifier of the plurality of incorrect identifiers is received.

8. The non-transitory computer-readable storage medium of claim 7, wherein the instructions for creating, using the identifier, the seed, comprise instructions for padding the identifier to create the seed.

9. The non-transitory computer-readable storage medium of claim 7, wherein the identifier and the seed comprise different numbers of bytes.

10. The non-transitory computer-readable storage medium of claim 7, wherein the instructions for creating, using the identifier, the seed, comprise instructions for using an exclusive or (XOR) function to create the seed using the identifier and a second piece of information.

11. The non-transitory computer-readable storage medium of claim 7, wherein the output datum comprises a private key.

12. The non-transitory computer-readable storage medium of claim 11, the computer program further comprising instructions for verifying a signature created using the private key.

13. The non-transitory computer-readable storage medium of claim 11, the computer program further comprising instructions for certifying a public key corresponding to the private key.

14. A non-transitory computer-readable storage medium having a computer-readable program embodied therein for directing operation of a computer system comprising a communication system, a processor, and a storage device, wherein the computer-readable program comprises instructions for operating the computer system to create an output datum based on an identifier supplied by a user, the instructions further comprising instructions for:
    receiving, from the user, the identifier, wherein the identifier is either a correct identifier or an incorrect identifier of a plurality of incorrect identifiers;
    creating, using the identifier, a seed, wherein:
    the seed is created regardless of the identifier being the correct identifier or the incorrect identifier of the plurality of incorrect identifiers; and
    the value of the seed when the correct identifier is received as the identifier is different from the value of the seed when the incorrect identifier of the plurality of incorrect identifiers is received; and
    creating, using the seed, the output datum, wherein:
    the output datum is created regardless of the correct identifier or incorrect identifier of the plurality of incorrect identifiers being received; and
    the value of the output datum when the correct identifier is received as the identifier is different from the value of the output datum when the incorrect identifier of the plurality of incorrect identifiers is received, wherein:
    the instructions for creating, using the identifier, the seed, comprise instructions for using a masked representation of the seed to create the seed; and
    the seed was previously used to create the masked representation of the seed.

15. A method for operating an access control system to create a correct output datum when a correct identifier is supplied, but create an incorrect output datum when an incorrect identifier is received, the method comprising:
    receiving, by a computer system, an identifier, wherein the identifier may be the correct identifier or one of a plurality of incorrect identifiers;
    creating, by the computer system, a seed using the identifier, wherein the value of the seed varies depending on whether the identifier is the correct identifier or one of the plurality of incorrect identifiers;
    creating, by the computer system, using the seed, an output datum, wherein the output datum is the correct output datum when the correct identifier is received, and the output datum is one of a plurality of incorrect output datum when one of the plurality of incorrect identifiers is received.

16. The method of claim 15, wherein the output datum comprises a private key.

17. The method of claim 15, wherein creating the seed using the identifier comprises padding the identifier.

18. The method of claim 16, further comprising certifying a public key corresponding to the private key.

19. A method for operating an access control system to create a correct output datum when a correct identifier is supplied, but create an incorrect output datum when an incorrect identifier is received, the method comprising:
    receiving, by a computer system, an identifier, wherein the identifier may be the correct identifier or one of a plurality of incorrect identifiers;
    creating, by the computer system, a seed using the identifier, wherein the value of the seed varies depending on whether the identifier is the correct identifier or one of the plurality of incorrect identifiers; and
    creating, by the computer system, using the seed, an output datum, wherein the output datum is the correct output datum when the correct identifier is received, and the output datum is one of a plurality of incorrect output datum when one of the plurality of incorrect identifiers is received, wherein:
    creating the seed using the identifier comprises using a masked representation of the seed; and
    the seed was previously used to create the masked representation of the seed.

20. The method of claim 19, wherein creating the seed using the identifier comprises using an exclusive or (XOR) function to create the seed using the masked representation of the seed.

* * * * *